United States Patent [19]

Lee

[11] Patent Number: 5,280,523
[45] Date of Patent: Jan. 18, 1994

[54] TELEPHONE LINE MESSAGE WAITING AND RING INDICATOR

[75] Inventor: Allan Y. F. Lee, London, Canada

[73] Assignee: Northern Telecom Limited, Montreal, Canada

[21] Appl. No.: 810,092

[22] Filed: Dec. 19, 1991

[51] Int. Cl.⁵ .............................................. H04M 1/00
[52] U.S. Cl. .................................. 379/376; 379/396; 379/353; 379/373
[58] Field of Search ............... 379/396, 376, 353, 373, 379/387

[56] References Cited

U.S. PATENT DOCUMENTS 4,648,109  3/1987  Boeckmann .................. 379/396 X
4,926,459  5/1990  Advani et al. ................. 379/376 X

OTHER PUBLICATIONS

Sales promotion brochure ("Message Waiting/Incoming Call Indication Units") from Rummel Engineering Consulting.

"Phone Flasher Bypasses Message Feature", (Design Ideas), EDN, Dec. 20, 1990.

Primary Examiner—James L. Dwyer
Assistant Examiner—Paul A. Fournier
Attorney, Agent, or Firm—Jean-Pierre Fortin

[57] ABSTRACT

A visual indicator circuit is provided for visually indicating that a telephone is ringing or that a message is waiting. The circuit includes a visual indicator such as a light emitting diode (LED), a voltage triggering circuit for triggering when a minimum predetermined voltage is applied to the telephone lines, and a current limiting circuit for limiting the current provided to the LED.

8 Claims, 4 Drawing Sheets

TELEPHONE LINE MESSAGE WAITING AND RING INDICATOR

FIELD OF THE INVENTION

This invention is in the field of telephone station apparatus and more particularly relates to monitoring the operational status of a telephone line connected to a telephone station apparatus.

BACKGROUND OF THE INVENTION

Most key telephone sets are equipped with a bell or other audio indicator and some sets are also equipped with a visual indicator for indicating that the telephone set is ringing. Visual indicators are sometimes used to indicate that a message is waiting. This feature is often used by hotels having a private branch exchange (PBX). For example, if a hotel attendant wishes to alert a hotel guest that a message is waiting, the PBX may be programmed to switch on a message waiting indicator (MWI) on the recipient's telephone set once the handset is on-hook. A neon lamp, which is set to flash periodically is usually used.

With the advent of voice mail, public telephone subscribers may leave messages for other subscribers thereby invoking a similar scheme wherein a visual indicator indicates that one or more messages is waiting.

Typically these visual indicators are mounted in the housing of the telephone set and are comprised of a circuit including a neon lamp in series with a resistor coupled to the tip and ring terminals of a subscriber telephone line. The neon lamp provides the triggering threshold and the visual indication when the telephone set is ringing or when a message waiting signal is applied to the line. Although this approach is very simple, it has several shortcomings:

a) Neon lamps usually do not have precise firing points as the triggering threshold or firing point often varies from 80 to 130 volts.

b) The extinguishing voltage can be as much as 45 volts below the firing point. In telephone lines where the nominal voltage is 48 volts DC, the neon lamp may inadvertently stay on after the message waiting voltage (MWV) or ringing signal is removed.

c) Once the neon lamp has fired, there is no current control in the circuit and the circuit resistance is approximately the resistance of the series resistor. Varying the current causes varying brightness of the neon lamp; too much current can cause the lamp to burn out prematurely. Furthermore, the triggering of one neon lamp very often prevents the neon lamp in a second telephone set on the same telephone line from firing.

d) The firing and extinguishing characteristics of a neon lamp changes with prolonged usage.

SUMMARY OF THE INVENTION

It is an object of the invention to provide a detection circuit which will overcome the problems and deficiencies of many conventional circuits.

In accordance with the invention there is provided, a circuit connected across a telephone line for indicating the presence of an alerting signal on the line and able to maintain a high impedance across the line such that a plurality of same circuits operating in parallel on the line can simultaneously indicate the presence of the signal, said circuit comprising an indicator means; a voltage trigger circuit responsive to a signal proportional to an alternating signal, and able to trigger when the alternating signal reaches a predetermined minimum voltage; and means for controlling current through the indicator means, wherein said controlling means being responsive to the voltage trigger circuit such that when the voltage trigger circuit means is triggered, the indicator means is turned on and a constant current is allowed to flow therethrough and when the voltage trigger circuit stops triggering the indicating means is turned off.

BRIEF DESCRIPTION OF THE DRAWINGS

Embodiments of the invention will now be described with reference to the accompanying drawings in which.

DETAILED DESCRIPTION OF THE DRAWINGS

Figure 1:
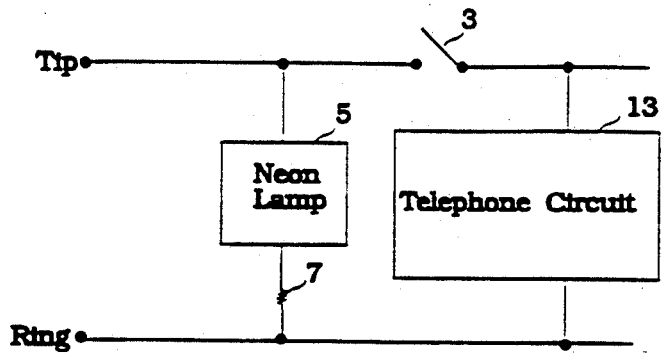
FIG. 1 is a block diagram of a typical prior art visual indicator circuit.

Referring to FIG. 1, there is illustrated a prior art form of a subscriber line visual indicator circuit.

A neon lamp 5 and a resistor 7 are connected in series across tip and ring lines. A telephone circuit 13 including a polarity guard circuit (not shown) is connected to the tip and ring lines in parallel with the neon lamp 5 and resistor 7. A hook switch 3 provides a means of detecting if the telephone is on-hook or off-hook. An on-hook condition exists when the telephone is not in use and conversely an off-hook condition exists when the line is in use and the receiver is off-hook. When the circuit operates ideally according to its rated specifications the neon lamp 5 fires when the potential difference at the terminals, that is, Tip and Ring, is between 80 to 130 volts. At that instant, the value of the resistance across the neon lamp 5 and resistor 7 is little more than the value of the resistance of the resistor 7. Thus, the brightness of the neon lamp 5 is variable and proportional to the potential difference across the Tip and Ring terminals. The voltage at which the lamp extinguishes may be as much as 45 volts below the minimum firing voltage of 80 volts. The nominal potential difference between Tip and Ring terminals is 48 volts DC. Therefore there may be instances when the neon lamp may inadvertently remain on after a ringing signal is applied or after a message waiting signal is removed.

Figure 2:
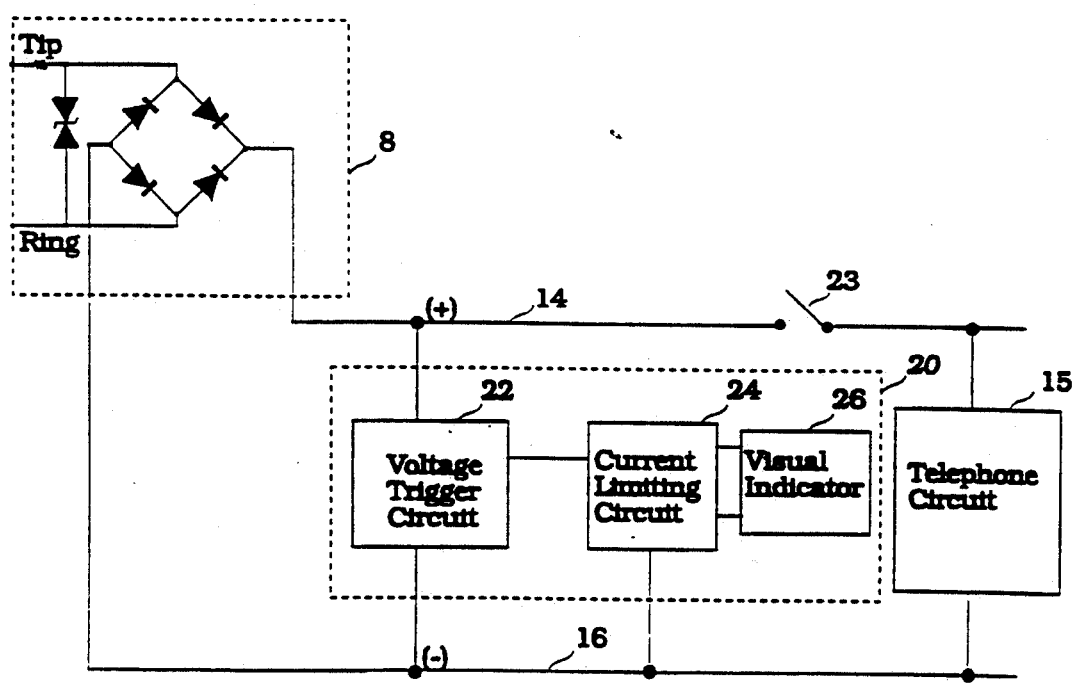
FIG. 2 is a block diagram of a detection circuit in accordance with the invention.

Referring to FIG. 2, there is shown a block diagram of a detection circuit having a visual indicator circuit 20. The visual indicator circuit 20 comprises a voltage trigger circuit 22, a current limiting circuit 24 and a visual indicator 26. The block diagram further includes circuitry 8, for supplying to the voltage trigger circuit on lines 14 and 16, a voltage dependent upon the voltage between the tip and ring wires of a two-wire telephone subscriber line. The circuitry 8 includes a diode bridge having an AC input signal connected across input Tip and Ring terminals. These are coupled to the two wires of the telephone subscriber line as described further below. The positive DC output terminal of the diode bridge is connected to line 14, which constitutes a common rail in the apparatus of FIG. 2. A negative terminal is connected to a grounded line 16. A hookswitch in series with line 14 provides a means for on-hook/off-hook detection which may be performed by a central office switch or a PBX. Circuitry 8 also acts as a polarity guard, which is common in most telephone sets. A conventional telephone circuit 15 is connected in parallel with the visual indicator circuit 20.

In operation, the voltage trigger circuit 22 controls the on/off state of the visual indicator 26 at a precise triggering voltage. This triggering voltage is usually provided by an alternating signal hereafter termed an alerting signal in the form of a ringing signal or a lower frequency message waiting signal. In the preferred embodiment, the visual indicator 26 is a light emitting diode (LED). However, a neon lamp or other light source may be used as well. The visual indicator 26 may be replaced with other indication means such as an audio indicator.

The current limiting circuit 24 provides the function of limiting and regulating the current or voltage to the LED or lamp thereby providing a constant current to the LED. A constant current is a current which varies negligibly within small predetermined limits. Limiting the current available to the visual indicator circuit 20 and ensuring that most of the limited available current is provided to the LED, allows a plurality of telephone sets to be connected in parallel to the same tip and ring wires without excessive loading.

Figure 3:
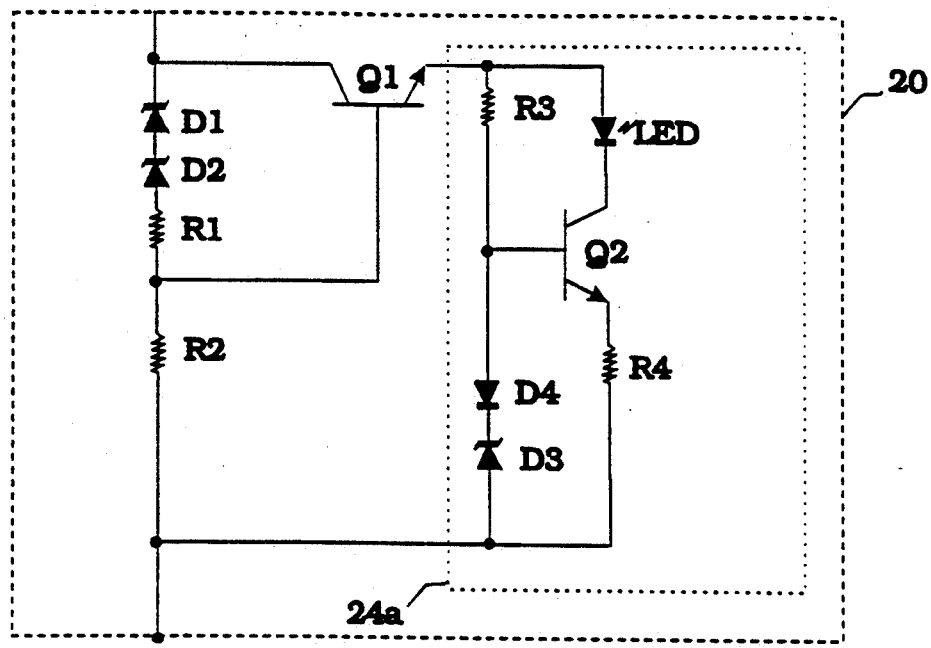
FIG. 3 is a circuit diagram of an embodiment of a visual indicator circuit shown in FIG. 2.

The visual indicator circuit 20 is shown in more detail in FIG. 3. In this Figure the voltage trigger circuit 22 is comprised of zener diodes D1 and D2, resistors R1 and R2 forming a potential divider, and an electronic switching means in the form of a transistor Q1. By way of example, resistors R1 and R2 can have resistances of 100 K$\Omega$ and 1 M$\Omega$ respectively. The zener diodes which can have a combined rating of 107 volts serve to bias the base of transistor Q1 thereby triggering the circuit. When the voltage across the zener diodes D1 and D2 increases beyond 107 volts, diodes D1 and D2 are switched on, thereby triggering the voltage trigger circuit 22. Alternatively, a single zener diode similarly rated to the combined values of diodes D1 and D2 may also be used. Since the resistance value of R1 is 10 times less than the value of R2, most of the remaining voltage drop over and above the 107 volts required to switch on the diodes D1 and D2 is across resistor R2, thereby ensuring that the excess voltage above 107 volts will be at the base of transistor Q1. As the voltage at the base of Q1 increases Q1 conducts more current.

Figure 4:
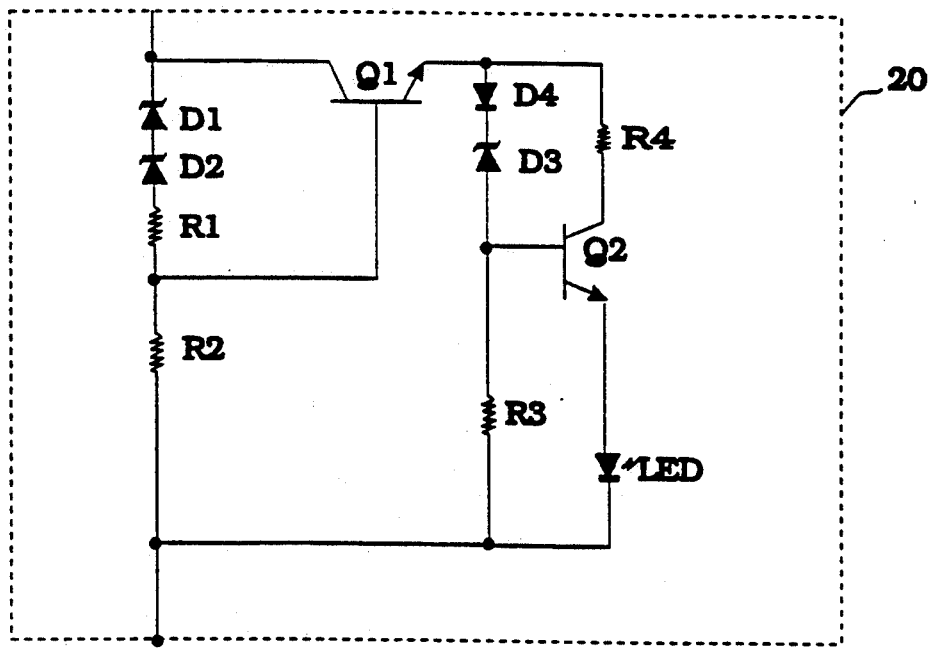
FIGS. 4, 5, and 6 are circuit diagrams of alternative embodiments of the visual indicator circuit shown in FIG. 3.
Figure 5:
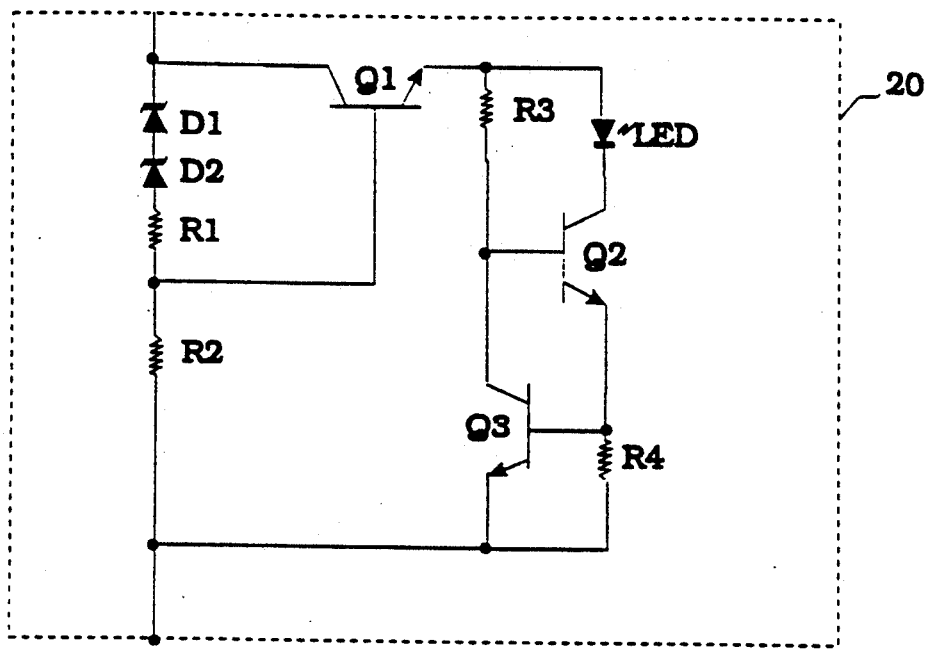
Figure 6:
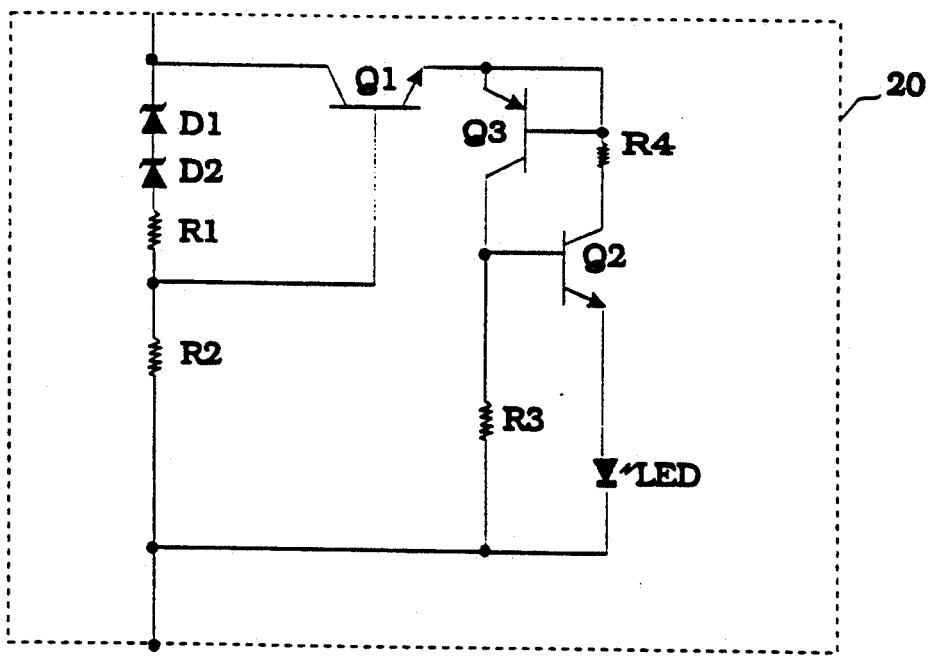

In FIG. 3, the current limiting circuit 24a is comprised of resistors R3 and R4, electronic switching means in the form of transistor Q2, zener diode D3 and blocking diode D4. In operation, the current limiting circuit ensures that once the voltage trigger circuit 22 has triggered and Q1 is conducting, the current through the LED is regulated to a predetermined value. This ensures that the LED is maintained at a uniform brightness since the current will vary negligibly. The circuit 20 also provides a high impedance to the line 14 thus allowing multiple detecting circuits in parallel on the same subscriber line without excessive loading when triggering. Variations of this current limiting circuit may be considered. In FIG. 4, the placement of diode, resistor, and LED configuration has been interchanged. Diodes D3 and D4 shown in the circuits of FIGS. 3 and 4 may be replaced with a transistor Q3 as shown in FIGS. 5 and 6 wherein transistors Q2 and Q3 are cross coupled.

Figure 7:
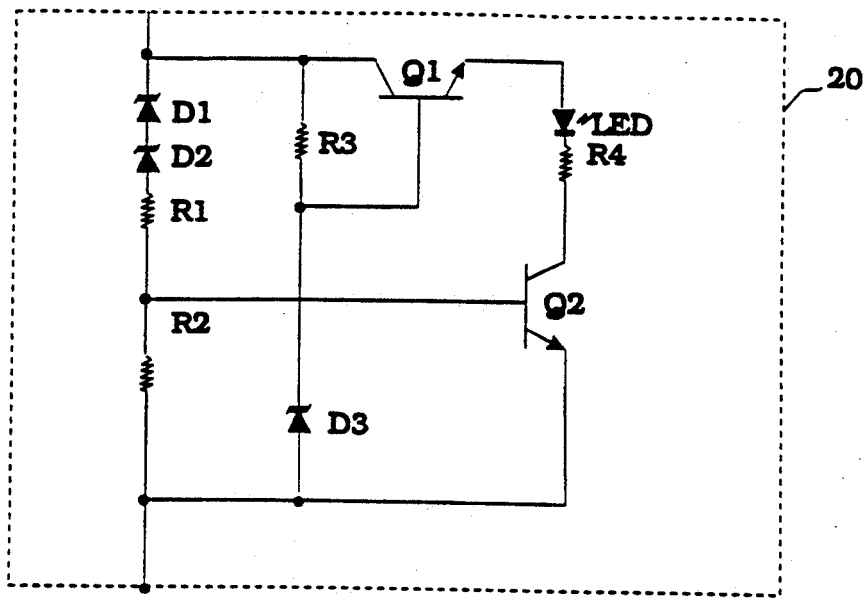
FIG. 7 is a circuit diagram of an alternative embodiment of a visual indicator circuit wherein the visual indicator is controlled by voltage regulation.

In the embodiment shown in FIG. 7, any current passing through the LED is controlled by controlling the voltage across the LED and a series resistor R4. After sufficient voltage is applied to the Tip and Ring terminals and after transistors Q1 and Q2 are switched on, the voltage across the LED and R4 is clamped to a predetermined value thereby regulating the current through the LED.

Figure 8:
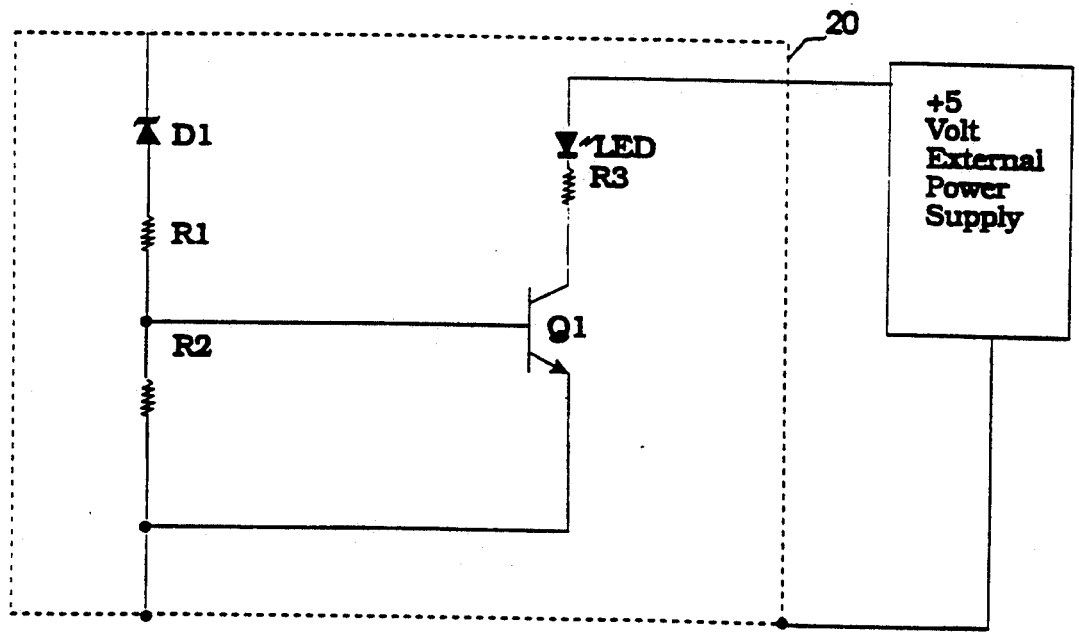
FIG. 8 is a circuit diagram of an alternative embodiment of the visual indicator circuit shown in FIG. 3 wherein a visual indicator is powered by an external regulated power supply.

Many telephone sets are equipped with an external power supply for powering circuitry such as microprocessors, programmable memory devices, visual displays and the like. The circuit shown in FIG. 8 is an adaptation of the circuit of FIG. 3 wherein an external power supply is used to power an LED. A 110 volt zener diode D1 is shown connected to a voltage divider comprising resistors R1 and R2. Exemplary values of resistors R1 and R2 are 200 and 330 $\psi$ respectively. After the triggering voltage is reached, transistor Q1 which is biased by resistors R1 and R2 switches on and will thus limit the current available to the LED.

In operation, the LED remains off until the 110 volt zener diode D1 begins to conduct. After the voltage is sufficient for D1 to conduct and for enough current to pass through R2 such that the base to emitter junction of Q1 is forward biased, the LED switches on. Since the base of Q1 cannot exceed the voltage of a forward biased diode, the current through the LED remains limited and approximately constant.

Limiting the current provided to the LED in the embodiments described above ensures that enough current will be available to allow a plurality of telephone sets connected in parallel to visually indicate that a message is waiting or that a telephone is ringing. Limiting the current available to each visual indicator is more cost efficient than allowing large amounts of current to flow through the neon lamp as in the prior art circuit shown in FIG. 1.

What is claimed is:

1. A circuit connected across a telephone line for indicating the presence of an alerting signal on the line and able to maintain a high impedance across the line such that a plurality of same circuits operating in parallel on the line can simultaneously indicate the presence of the signal, said circuit comprising:

an indicator means;

a voltage trigger circuit connected in parallel with said indicator means, said voltage trigger means being responsive to a signal proportional to the alerting signal, and able to trigger when the alerting signal reaches a predetermined minimum voltage;

a constant current source in series with the indicator means for regulating the amount of current flowing through the indicator means; and switching means, in series with said indicator means, said switching means being responsive to the voltage trigger circuit such that when the voltage trigger circuit is triggered, said switching means is turned on to allow current to the indicator means via the constant current source thereby turning on said indicator means and when the voltage trigger circuit stops triggering, said switching means and said indicating means are turned off.

2. A circuit as defined in claim 1 wherein the indicator means comprises a light emitting diode.

3. A circuit as defined in claim 1 wherein the switching means is a transistor.

4. A circuit as defined in claim 1 wherein the voltage trigger circuit includes a zener diode for allowing the voltage trigger circuit to trigger at a predetermined threshold.

5. A circuit as defined in claim 1, further comprising an external power supply for providing current to the indicator means.

6. A circuit as defined in claim 2, further comprising an external power supply for providing current to the indicator means.

7. A circuit as defined in claim 3, further comprising an external power supply for providing current to the indicator means.

8. A circuit as defined in claim 4, further comprising an external power supply for providing current to the indicator means.

* * * * *